R. H. MINICH.
CAR BRAKE.
APPLICATION FILED NOV. 10, 1920.

1,416,371.

Patented May 16, 1922.
5 SHEETS—SHEET 2.

INVENTOR
Russell H. Minich
By W. W. Williamson
Atty.

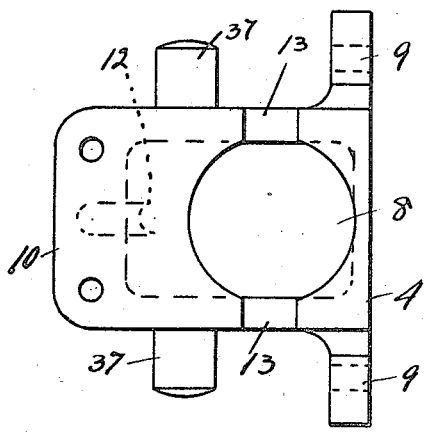
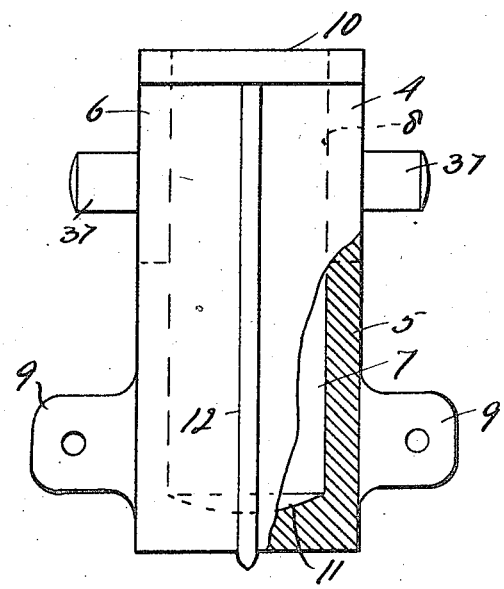
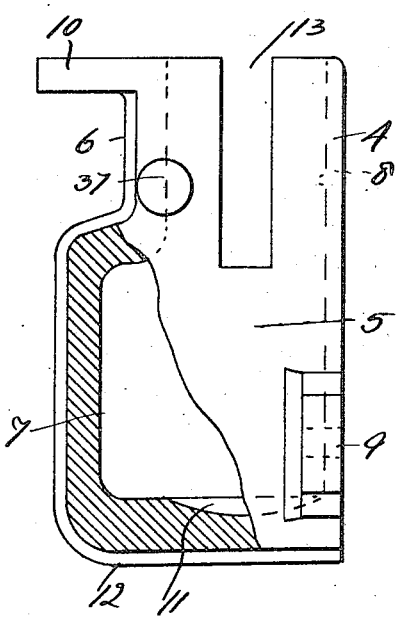

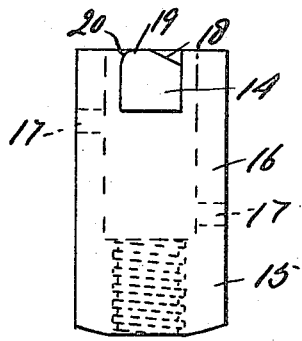
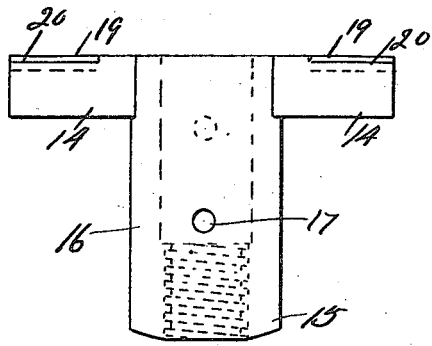
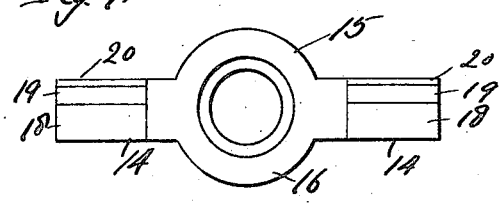
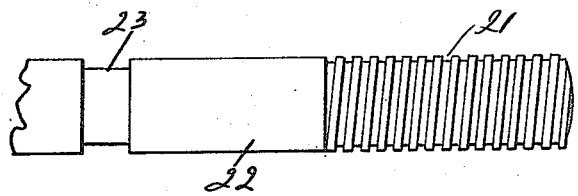
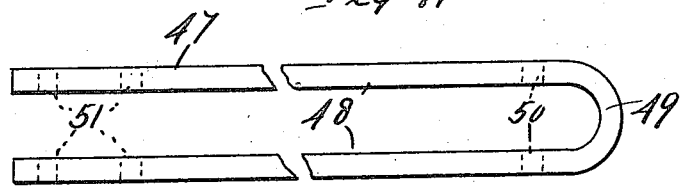

R. H. MINICH.
CAR BRAKE.
APPLICATION FILED NOV. 10, 1920.
1,416,371.
Patented May 16, 1922.
5 SHEETS—SHEET 5.
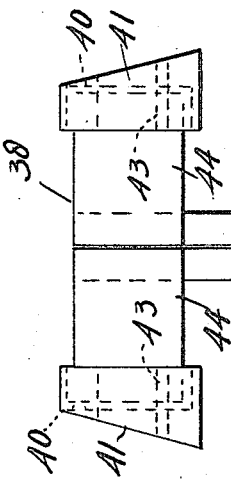
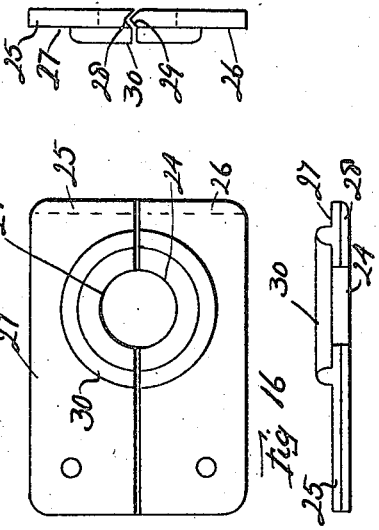
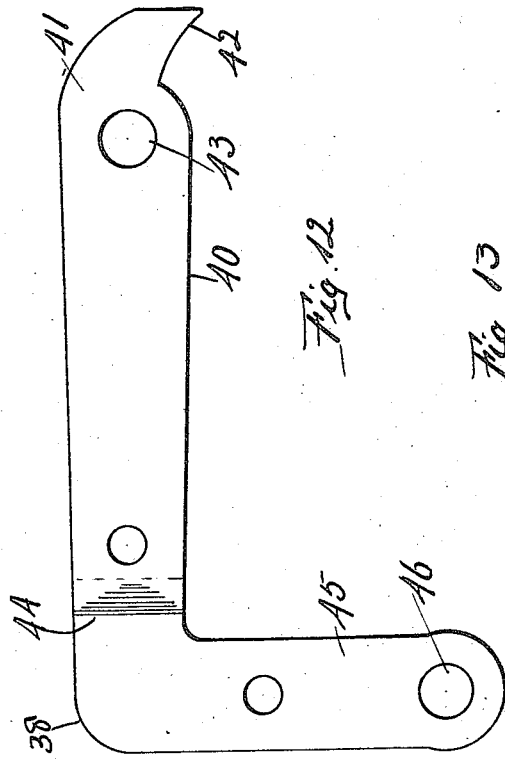
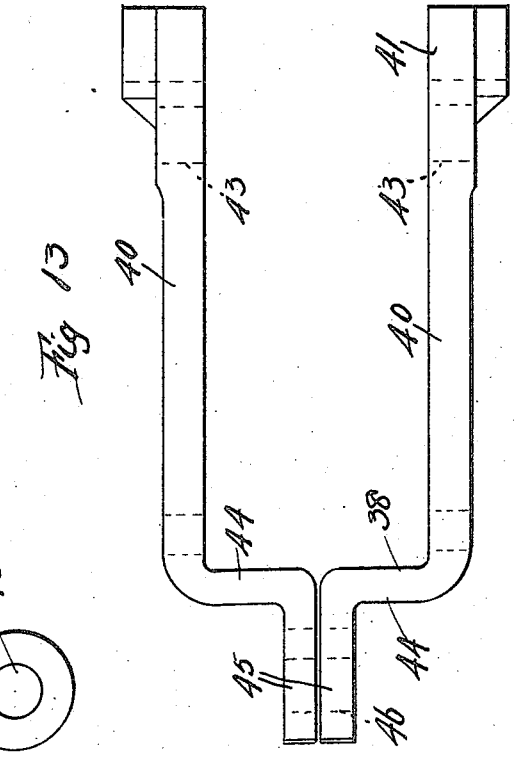
INVENTOR
Russell H. Minich
By W. W. Williamson
Atty.

UNITED STATES PATENT OFFICE.

RUSSELL H. MINICH, OF PHILADELPHIA, PENNSYLVANIA, ASSIGNOR TO MINICH RAILWAY APPLIANCE CORPORATION, OF PHILADELPHIA, PENNSYLVANIA, A CORPORATION OF DELAWARE.

CAR BRAKE.

1,416,371.　　　　　Specification of Letters Patent.　　Patented May 16, 1922.

Application filed November 10, 1920. Serial No. 422,988.

*To all whom it may concern:*

Be it known that I, RUSSELL H. MINICH, a citizen of the United States, residing at Philadelphia, in the county of Philadelphia and State of Pennsylvania, have invented new and useful Improvements in a Car Brake, of which the following is a specification.

My invention relates to new and useful improvements in a car brake, and particularly to that class of a car brake known as a hand brake the same being operated manually, and has for its object to provide a device of this character which will be simple in construction and relatively inexpensive in the cost of manufacture although exceedingly strong and durable and highly effective in the application of the braking power.

Another object of the invention is to provide for the elimination of the ordinary ratchet and pawl so that the brake will hold exactly where applied and desired making it unnecessary to give a retrograde movement for catching a certain ratchet tooth and also making it unnecessary to further tighten the brake before releasing.

Another object of the invention is to so construct a hand brake that the same may be applied to cars of different construction which may be used in a train with other cars not so equipped the elements of said brake being so associated as to provide a much greater braking power than under hand brakes of present day construction making it unnecessary to use a brake stick or club.

A further object of the invention is to provide a hand brake in which the stress on the staff is longitudinal thereof thereby greatly overcoming the possibility of the parts being bent or forced out of alignment.

A still further object of the invention is to provide a hand brake consisting of a vertical staff attached as usual to the end of a car, said staff projecting into a cage or housing and provided with a threaded inner end on which is mounted a nut having oppositely disposed lugs traveling in slots in the housing and coacting with the outer ends of a U shaped lever fulcrumed on the cage or housing and having a depending leg for attachment to one end of a connecting bar, the opposite end of which is connected with some suitable part of the ordinary brake rigging.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 4, is a plan or upper end view of the cage or housing.

Fig. 5, is a rear face view thereof having a portion broken away to illustrate the interior construction.

Fig. 6, is a side elevation thereof having a portion broken away to illustrate the interior construction.

Fig. 7, is a side elevation of the winged nut or threaded barrel having lugs for engagement with the U shaped lever.

Fig. 8, is a view at right angles to Fig. 7.

Fig. 9, is an upper end view thereof.

Fig. 10, is a side elevation of the lower portion of the brake staff.

Fig. 11, is an edge view of the double connecting bar.

Fig. 12, is a side elevation of a U shaped lever.

Fig. 13, is a plan view thereof.

Fig. 14, is an end view thereof.

Fig. 15, is a plan view of the lid or cap for the cage or housing.

Fig. 16, is an edge view of one of the lid or cap sections.

Fig. 17, is an end view of Fig. 15.

Figure 1:
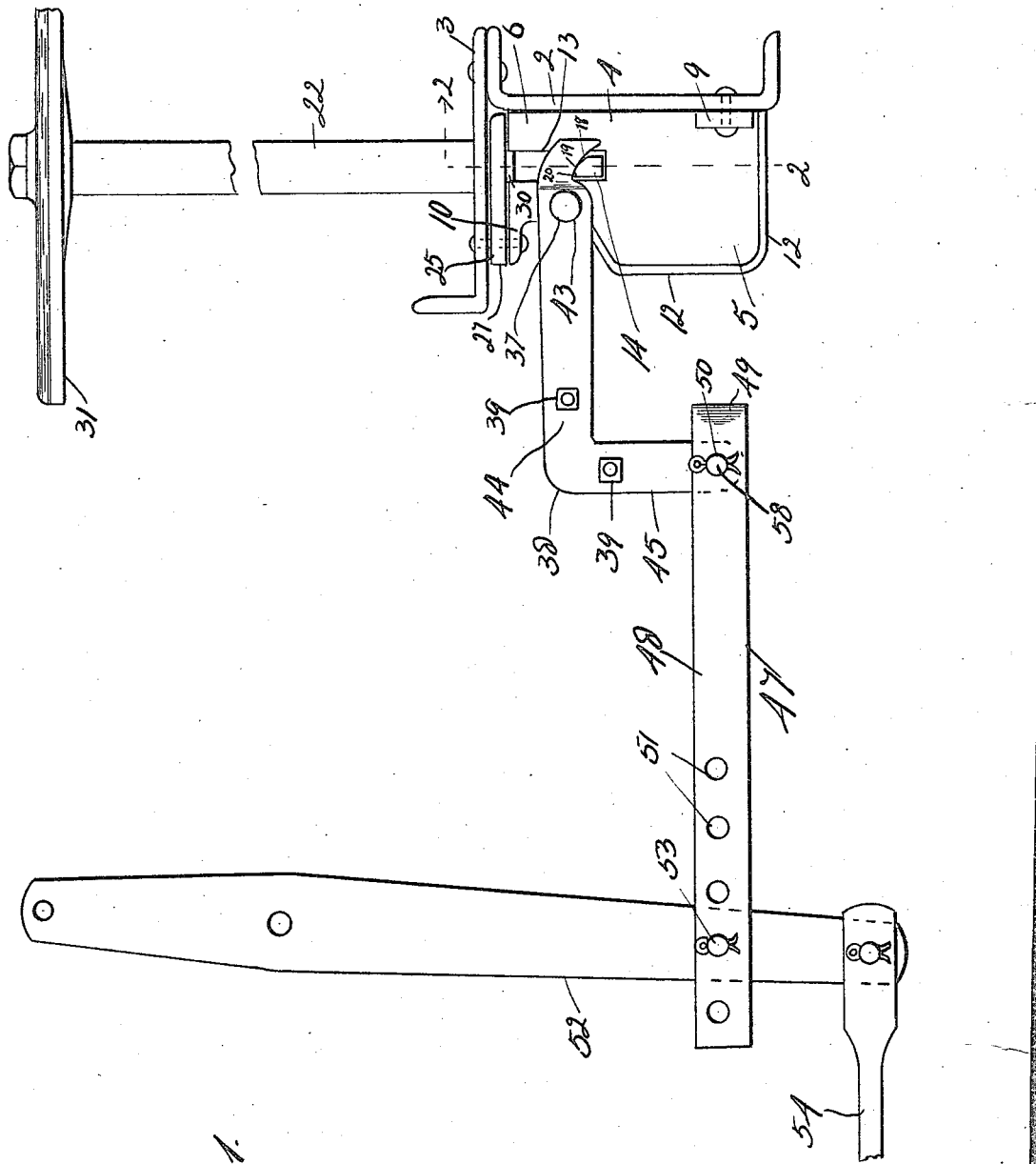
Fig. 1, is a side elevation of my improved hand brake showing one arrangement for attaching the same to a car sill and showing its connection with a portion of a brake rigging.
Figure 2:
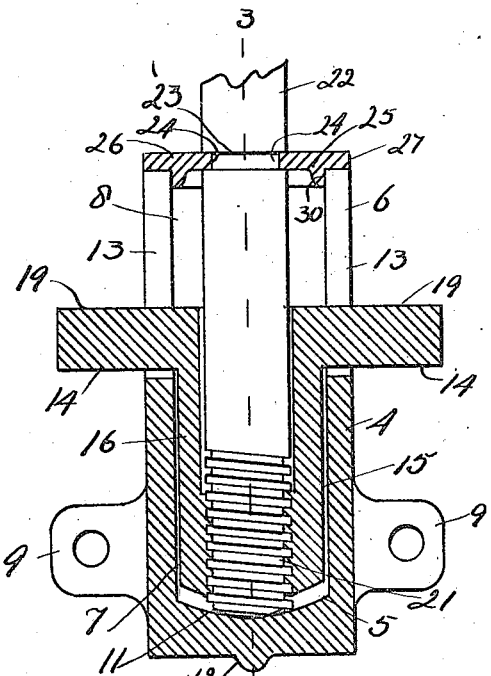
Fig. 2, is an enlarged sectional view at the line 2—2 of Fig. 1.
Figure 3:
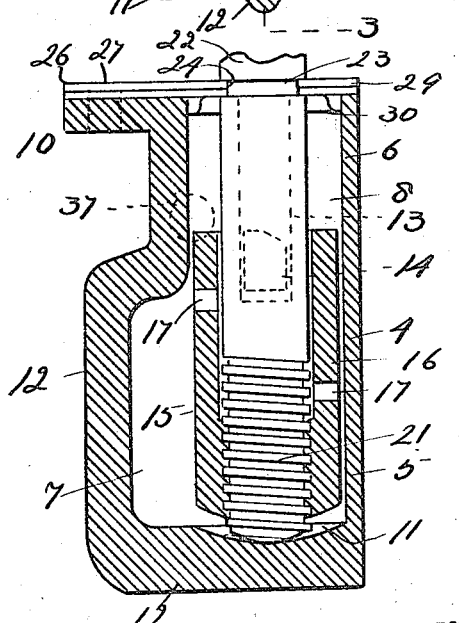
Fig. 3, is a section at the line 3—3 of Fig. 2.

In carrying out my invention as here embodied, 2 and 3 represent the channel and angle irons forming a part of the car sill to which is attached the cage or housing 4 preferably produced as a casting having a body portion 5 and a neck portion 6 which is restricted from the rear face. In the body portion is formed the chamber 7 with which communicates at its upper end an opening or bore 8 smaller than the chamber 7. The housing or cage is provided with suitable wings or flanges 9 and 10 suitably positioned for fastening the cage or housing to some desirable part of a car such as a sill hereinbefore mentioned, but these wings or flanges may be differently positioned than as here shown where it is necessary to apply the housing to some other part of a car or to cars of different construction. The chamber 7 forms a lubricant reservoir and in the lower wall of this chamber or the bottom of the housing is formed a recess 11 to receive the lower end of the staff as will be hereinafter described and portions of the walls of the housing may be strengthened by a rib 12.

In two opposite side walls of the housing or cage are formed slots 13 in the region of the neck portion of the housing which are open at their upper ends and with these slots register the lugs or wings 14 of the wing nut 15, Figs. 7, 8 and 9. The wing nut comprises a barrel 16 having a bore of two different diameters the smaller portion of the bore being threaded and adapted to engage the threaded end of the staff as will be hereinafter described and in order to properly lubricate said wing nut the barrel is provided with lubricant holes 17. With the upper end of the barrel are formed the oppositely disposed wings or lugs 14 which project through the slots 13 in the housing and operate vertically therein while preventing any rotation of the wing nut and the upper faces of these wings or lugs each has a forwardly inclined surface 18, an upper horizontal face 19 and a rearward inclined face 20 so that the bearing surface of each lug is relatively small.

The wing nut 15 is screwed upon the threaded end 21 of the staff 22 which is vertical when in operative position with its lower end resting in the recess 11 in the lower end of the cage or housing and at a point in the region of the upper end of the cage or housing the staff is provided with a circumferential groove 23 with which registers the arcuate edges 24 of the plates 25 and 26 forming the lid or cap 27, the meeting edge of one of said plates, as 25, having a V shaped groove 28 for registration with a V shaped tongue 29 in the coacting edge of the complementary plate, as 26. With each plate is formed a depending segmental rib or rim 30 for registration with the bore 8 and engagement with the side walls of the cage or housing about said bore thereby reducing the possibility of water or other foreign matter entering the chamber of the housing or cage, while the tongue and groove between the plates increases the bearing surface while making the same circuitous which will also prevent the likelihood of water and foreign substances entering the housing from the upper end.

The housing or cage is provided at two sides with oppositely projecting outer trunnions 37 located to the rear of the vertical slots therein and a short distance above their lower or closed ends. On these trunnions is fulcrumed the U shaped lever 38 formed of two sections or elements bolted together as at 39, each element or section comprising an arm 40 having a tapering enlargement 41 at one end to provide a large bearing surface 42 for engagement with the wings or lugs of the winged nut, said bearing surface being arcuate longitudinally or slightly hook shaped and to the rear of this enlargement is formed a hole 43 for registration with the trunnion 37. The other end of the arm has an inwardly projecting extension 44 from which depends a leg 45 having a hole 46 in the end thereof. The two members when in cooperation or when fastened together produce the U shaped lever and the legs of said members are in contact as plainly shown in Figs. 13 and 14.

The yoke formed by the arms 40 and the extensions 44 is of sufficient length or size to pass beneath the cage or housing should the throw of the U shaped lever be that great at any time thereby giving a long movement to the lower ends of the legs 45 while the hooked ends of the U shaped lever move but a very short distance.

To the lower ends of the legs 45 is attached a connecting bar 47 in any suitable manner as by a pin 58 and this connecting bar comprises two parallel arms 48 joined together by a cross piece 49 formed integral therewith, or in other words, the connecting bar is formed of a single piece of metal bent upon itself with the arm sections spaced apart and running parallel to each other and adjacent the end where the arms are joined together are formed holes 50 one in each arm for the passage of the pin 58 while at the opposite end of each of said arms is formed a series of holes 51 by which said connecting bar may be connected with any suitable part of the brake rigging it being here shown as connected with the air brake lever 52 by a pin 53 passing through the arms 48 of the connecting bar and said brake lever, but it will be obvious that this connection could be made direct to the brake rod 54 which is here shown as connected with one end of the air brake lever 52.

In practice the cage or housing may be applied to any suitable portion of a car preferably the end sill thereof although it may be necessary to make slight changes in the exterior shape of the cage or position the flanges 9 and 10 differently from that herein shown, the illustration representing that of the ordinary hopper bottom steel car, while the brake rigging represents an ordinary arrangement of parts used with such cars but as the brake rigging forms no part of this invention it is only shown to illustrate one manner in which the device may be connected therewith.

The lower end of the staff 22 resting in the recess 11 centers the lower end of said staff and prevents undue sidewise movement thereof, while it also acts as a bearing for the lower end of said staff. During the rotation of the staff in that direction which will cause the winged nut 15 to move upward on said staff within the housing or cage the wings or lugs 14 will be raised to lift the hooked ends of the U shaped lever and cause it to move about its fulcrums 37, and during this lifting of the hooked or shorter ends of the U shaped lever the distance between the fulcrums thereof and the bearing points of the hooked ends upon the lugs or wings 14 will gradually increase so that the speed of the movement of the U shaped levers is gradually decreased. This causes the U shaped lever to quickly take up the slack in the brake rigging during the beginning of the application of the brake while toward the end of the application the braking power is increased causing the brakes to be firmly forced into engagement with the wheels of the car without the use of a brake stick or club.

The wing nut through the medium of which power is transmitted from the brake staff to the U shaped lever being threaded upon said staff makes it unnecessary to use a pawl and ratchet for holding the parts in their applied positions and to release the brake it is only necessary to reverse the rotation of the staff and this releasing of the brakes cannot be accomplished suddenly as does happen where a chain is used which is wound upon the brake staff thereby preventing the possibility of trainmen being thrown from the car during the releasing of the brakes or during the application of the brakes should the hand wheel be accidentally released and the ordinary pawl and ratchet not in place.

The connecting bar 47 forms a rigid connection between the U shaped lever and the brake rigging so that power is transmitted directly from the U shaped lever to the brake rigging without lost motion and it eliminates the use of a chain which is unsatisfactory because it often winds upon itself or catches in the staff yoke and so loses its effectiveness.

Of course I do not wish to be limited to the exact details of construction as herein shown as these may be varied within the limits of the appended claims without departing from the spirit of my invention.

Having thus fully described my invention, what I claim as new and useful is:—

1. A car brake comprising a cage having slots therein and provided with trunnions, a staff projecting into said cage, means for rotating said staff, a wing nut threaded on said staff within the cage, lugs carried by said nut and projecting through the slots in the cage, a U shaped lever journalled upon the trunnions and coacting with the lugs and a connecting bar having one end attached to the U shaped lever adapted to be engaged with a brake rigging.

2. A car brake comprising a cage, a staff journalled therein, a lever journalled on the outside of the cage, means threaded on said staff for coaction with the lever to actuate the latter the distance between the coacting points of the lever and said means and the fulcrum point of said lever changing during the movements of said means.

3. In a brake, a cage comprising a body and neck, said body having a lubricating chamber with a recess in the bottom wall and the neck provided with a bore communicating with the chamber and having oppositely disposed slots in the walls thereof, flanges formed with the cage for attaching the same to a car and oppositely projecting trunnions on opposite sides of the cage.

4. In a brake, the combination of a staff having a threaded lower end with a winged nut comprising a barrel threaded throughout a portion of its bore for coaction with the threaded end of the staff and oppositely disposed lugs or wings formed with the upper end of said barrel, each lug having a forwardly inclined face, a horizontal face and a rearwardly inclined face for the purpose stated.

5. In a hand brake, a U shaped lever comprising two members each consisting of an arm having an enlargement at one end on the underside of which is formed a hooked bearing surface, an extension at the other end, and a depending leg and means for fastening said members together.

6. In a car brake, a casing lid consisting of two coacting members the meeting edge of one having a groove for coaction with a tongue formed with the meeting edge of the other member, each of said members having a semi-circular notch and a semi-circular rib.

7. A hand brake for cars comprising a cage having a recess in its bottom wall and slots in two opposite side walls, said cage also having a chamber and a restricted bore, a staff having its lower or inner end threaded and provided with a circumferential groove, said staff being mounted in the cage with its lower end resting in the recess thereof, a lid for said cage consisting of two members or sections fastened to the upper end of the cage surrounding the staff with portions thereof projecting into the groove in said staff, a hand wheel on said staff for rotating the same, a nut mounted on the threaded end of the staff and vertically movable within the cage, lugs carried by said nut projecting through the slots in the cage, trunnions formed on the cage adjacent the slots therein, a U shaped lever fulcrumed on said trunnions and having hooked bearing ends in engagement with the lugs of the nut and means for connecting said U shaped lever with a brake rigging.

8. A hand brake for cars comprising a cage having a recess in its bottom wall and slots in two opposite side walls, said cage also having a chamber and a restricted bore, a staff having its lower or inner end threaded and provided with a circumferential groove, said staff being mounted in the cage with its lower end resting in the recess thereof, a lid for said cage consisting of two members or sections fastened to the upper end of the cage surrounding the staff with portions thereof projecting to the groove in said staff, a hand wheel on said staff for rotating the same, a nut mounted on the threaded end of the staff and vertically movable within the cage, lugs carried by said nut projecting through the slots in the cage, trunnions formed on the cage adjacent the slots therein, a U shaped lever having a yoke with hooked ends and a depending leg, said lever being fulcrumed upon the trunnions with the hooked ends in engagement with the lugs of the nut the depending leg being capable of passing beneath the cage and a connecting bar attached to the lower end of the depending leg and having a series of holes whereby it may be adjustably attached to a brake rigging.

In testimony whereof, I have hereunto affixed my signature.

RUSSELL H. MINICH.